United States Patent [19]
Grattan et al.

[11] Patent Number: 4,999,645

[45] Date of Patent: Mar. 12, 1991

[54] ELECTRONICALLY CONTROLLED MARKING

[75] Inventors: Michael A. Grattan, Center Line; Sheldon J. Wolberg, Waterford, both of Mich.

[73] Assignee: Dell Marking Systems, Inc., Ferndale, Mich.

[21] Appl. No.: 471,533

[22] Filed: Jan. 29, 1990

[51] Int. Cl.[5] .............. G01D 15/18

[52] U.S. Cl. .............. 346/1.1; 346/75; 346/140 R

[58] Field of Search .............. 346/75, 140 R, 1.1

[56] References Cited

U.S. PATENT DOCUMENTS

| | | |
|---|---|---|
| 4,399,446 | 8/1983 | McCann et al. . |
| 4,460,904 | 7/1984 | Oszczakiewicz et al. . |
| 4,543,590 | 9/1985 | Tazaki et al. . |
| 4,550,321 | 10/1985 | Sato et al. . |
| 4,555,711 | 11/1985 | Sato . |
| 4,562,445 | 12/1985 | Rich . |
| 4,658,268 | 4/1987 | Needham . |
| 4,661,822 | 4/1987 | Hirota et al. . |
| 4,680,696 | 7/1987 | Ebinuma et al. . |
| 4,691,829 | 9/1987 | Auer . |
| 4,769,650 | 9/1988 | Peng et al. . |
| 4,772,911 | 9/1988 | Sasaki et al. . |
| 4,812,856 | 3/1989 | Wallace . |
| 4,827,280 | 5/1989 | Stamer et al. . |
| 4,855,753 | 8/1989 | Ichikawa et al. . |
| 4,860,027 | 8/1989 | Ozelis et al. . |

*Primary Examiner*—Bruce A. Reynolds
*Assistant Examiner*—Gerald E. Preston
*Attorney, Agent, or Firm*—Brooks & Kushman

[57] ABSTRACT

An electronically controlled marking system is provided to impart an ink spot to a stationary or moving target. The system includes an electronic control module connected to a high-pressure gas valve to control the passage of high-pressure gas to an ink spot maker, the electronic control module also being connected to a low-pressure gas valve to control the passage of low-pressure gas to the ink spot marker. Following the initiation of an ink spot marking cycle, low-pressure gas is applied to atomize ink within the ink spot marker; high-pressure gas is applied to force open a valve within the ink spot marker, thereby allowing ink to be ejected by the low-pressure gas toward the target; the high-pressure gas is removed to terminate the ejection of ink from the output nozzle, the low-pressure gas still being applied to force any remaining ink from the output nozzle; and the low-pressure gas is removed. Provision is also made for pulsing the high-pressure gas applied to the ink spot marker during the period that ink is being ejected to provide pulsed ink ejection.

30 Claims, 4 Drawing Sheets

ELECTRONICALLY CONTROLLED MARKING

TECHNICAL FIELD

This invention relates to electronically controlled ink marking systems using pressurized gas to eject ink toward a target.

BACKGROUND ART

Ink jet markers have been known in the art for some time. A typical marker has at least one output nozzle having an orifice; and, when a marking cycle is initiated, ink under pressure is directed to the output nozzle or ink already routed to the output nozzle is ejected through the orifice under pressure when an ink retaining valve in the nozzle is opened.

Several problems attend such devices, particularly if ink is to be applied to targets that are in relative motion with respect to the marker. Timing the beginning of ink ejection in devices having ink release valves produces, at best, inaccurately positioned marks. Position control in devices applying pressure to initiate ink ejection is usually even less accurate, often by several orders of magnitude. Additionally, when ink is ejected from such devices, the texture of the jet of previously unatomized ink is often initially inconsistent, resulting in a similarly inconsistent target mark.

After a mark has been produced, and ink ejection is to be terminated, removing pressure from the ink does not provide a substantially instantaneous cessation of ink flow. Closing a valve to terminate ink ejection provides a more instantaneous cessation of ink flow but has an attending problem of ink sometimes being left in the output nozzle and possibly jamming the valve partially open or jamming the nozzle orifice closed, these results frequently having serious, disruptive consequences, such as delayed or intermittent ink ejection or no ink ejection at all, during subsequent marking cycles.

U.S. Pat. No. 4,661,822 to Hirota et al. discloses an ink jet printer that includes a method for attempting to overcome the problem of having a print nozzle clogged by ink residue. The Hirota ink jet printer includes a pump to supply ink under pressure to the print nozzle. When the pressure of the ink supplied to the nozzle exceeds a certain value, or when the deflection of the ejected ink is improper, either of these conditions being indicative of a clogged nozzle, the pump is intermittently driven so that the ink pressure at the nozzle is oscillated in an attempt to remove the nozzle blockage.

The Hirota method for removing nozzle blockage represents a substantial improvement in the operating efficiency of ink jet printers; however, its effectiveness remains limited by the adhesion, composition and viscosity of the ink fouling the nozzle, especially when compared with the effectiveness of the pneumatic means disclosed by the present application for dissipating any ink remaining in a nozzle after ink ejection has been terminated and with the mechanical means disclosed by the present application for removing nozzle blockage during a period of ink ejection.

DISCLOSURE OF THE INVENTION

An object of the present invention is to provide an improved electronically controlled marking system having precision internal and external, manual and automatic control of ink spot marker parameters including the duration of an ink atomization period, ink spot location, ink ejecting pulse number and duration, and the duration of a nozzle cleaning period.

A further object is to provide an improved marking system that is electronically controlled and is not dependant on air logic.

Another object is to provide an improved marking system that accepts input signals from a variety of external sources, including electronic computers, optically isolated solid state relays, switches, photosensors and rotary encoders, and that filters external control signals to establish their validity.

Still another object is to utilize input signals from external, or remote, sensors and controls such as from a plant control system.

An additional object of the present invention is to provide a system capable of controlling a plurality of ink spot markers.

Another object is to provide a system that includes a visual display of ink spot marker parameters.

Still another object is to provide an improved system that may be installed and tested independently without being controlled by a plant control system.

An additional object of the present invention is to provide a system wherein the ink spot marker parameters are stored in a nonvolatile memory.

Yet another object of the present invention is to provide an improved electronically controlled marking system having a capability of pulsing pressurized gas controlling an ink-ejection controlling valve to aid in clearing a fouled ink spot marker output nozzle or to perform a specialized marking task.

In realizing the aforementioned and other objects, the electronically controlled marking system includes a high-pressure gas valve that is actuatable by a high-pressure gas valve solenoid and that has an input and an output. Its input is connected to a source of high-pressure gas. The system also has a low-pressure gas valve that is actuatable by a low-pressure gas valve solenoid and that also has an input and an output, its input being connected to a source of low-pressure gas. The system additionally has at least one ink spot marker that has an output nozzle, an ink input connected to a source of ink, a high-pressure input connected to the output of the high-pressure gas valve, and a low-pressure input connected to the output of the low-pressure gas valve.

The electronically controlled marking system also includes an electronic control module, which is electrically connected to the high-pressure gas valve solenoid to control the passage of high-pressure gas from the source thereof to the high-pressure input of the ink spot marker. The electronic control module is also electrically connected to the low-pressure gas valve solenoid to control the passage of low-pressure gas from the source thereof to the low-pressure input of the ink spot marker.

An input control signal is generated at a time $t_0$ by the electronic control module to initiate an ink spot marking cycle. The input control signal is generated in response to an external control signal received from externally located controls or in response to a control signal generated within the electronic control module. Low-pressure gas is applied by the low-pressure gas valve to the ink spot marker at a time $t_1$ to begin atomizing ink therewithin. High-pressure gas is applied by the high-pressure gas valve to the ink spot marker at a time $t_2$. The high-pressure gas withdraws a needle from an associated needle valve (not shown) in the output nozzle of the ink spot marker, thereby opening the needle valve and allowing the low-pressure gas to begin ejecting ink. High-pressure gas is removed by the high-pressure gas valve from the ink spot marker at a time $t_3$ to terminate ink ejection. Low-pressure gas remains applied to the ink spot marker to clear any remaining ink from the marker nozzle and is finally removed by the low-pressure gas valve from the ink spot marker at a time $t_4$. The period defined between time $t_0$ and time $t_1$ provides an adjustable interval to facilitate the accurate positioning of the ink spot if it is to be imparted to a moving target.

The electronic control module includes a microprocessor and a manually adjustable timing control for setting each one of the times $t_1$ through $t_4$ with respect to the input control signal generated at time $t_0$ to specify the periods defined thereby. The microprocessor has a nonvolatile memory, and the times $t_1$ through $t_4$ are stored therein.

The electronic control module also includes a manually operable pulse control switch to provide an option of ejecting ink from the output nozzle of the ink spot marker in a controllable series of pulses during the period defined between time $t_2$ and time $t_3$. The number of pulses selected is also stored in the nonvolatile memory of the microprocessor. The electronic control module further includes a manually operable marker control switch that can be set to indicate a maximum number of ink spot markers that are to be controlled by the electronic control module.

The electronic control module also has a display device to indicate visually the ink spot marker being monitored and, alternatively, various parameters selected therefor. The display may be a set of light-emitting diodes or a similar, well-known device. The parameters displayed include the number of pulses per marking cycle and the periods defined between time $t_0$ and time $t_1$, between time $t_1$ and time $t_2$, between time $t_2$ and time $t_3$, and between time $t_3$ and time $t_4$.

The electronic control module further includes a manually operable marker selector switch to select for display the parameters of a specific ink spot marker and to indicate which ink spot marker is actuated during a test. The electronic control module also has a manually operable marker parameter selector switch to select for display a specific parameter of the ink spot marker selected by the marker selector switch.

Additionally, the electronic control module includes a manually operable external-internal switch having "external" and "internal" positions, a manually operable test-program switch having "test" and "program" positions, and a manually operable test switch having a momentary, actuated position and a normal, nonactuated position. When set to its "external" position, the external-internal switch allows external control signals to be input to the microprocessor. The external control signals may be routed through an external signal filter to establish their validity, the external signal filter generating input control signals in response to recognizing valid external control signals. With the test-program switch set to its "test" position and the external-internal switch set to its "internal" position, the ink spot marker selected by the marker selector switch is actuated in response to an input control signal generated by the microprocessor when the test switch is actuated. With the test-program switch set to its "program" position and the external-internal switch set to its "internal" position, the parameters of a selected ink spot marker are stored in nonvolatile memory when the test switch is actuated.

The electronically controlled marking system may be operated in any one of three modes. The basic mode, which has been the mode of operation described to this point, is referred to as a dot marking mode. The marking system may also be operated in a continuous stripe marking mode and in a continuous pulse marking mode.

In the continuous stripe marking mode, whenever a valid external control signal is received, the high-pressure gas is applied to the ink spot marker, opening the needle valve thereof and allowing the low-pressure gas to eject ink until the external control signal is no longer received. If the option of ejecting ink in pulses is selected, the high-pressure gas is applied in pulses the number of which equals one less than the number of pulses selected. The high-pressure gas is then applied continuously until the external control signal is no longer received.

The effect of operating in the continuous stripe marking mode on the application sequence of high-pressure and low-pressure gas to control various elements of the electronically controlled marking system may be more easily understood by referring to the timing chart illustrated by FIG. 4. When operating in the continuous stripe marking mode, once a valid external control signal is received, the occurrence of the time $t_3$ is delayed until the external control signal is no longer received, the time $t_3$ being the time at which high-pressure gas is removed from the ink spot marker.

The continuous application of high-pressure gas may be interrupted by a series of off pulses generated by the electronic control module. The periods between the off pulses may be selected, and they may be varied between 6 seconds and 20 minutes. A period value of zero may also be selected, in which case no off pulses are generated. The width of the off pulses are determined by the pulse width parameter selected.

In the continuous pulse marking mode, whenever a valid external control signal is received, the high-pressure gas is applied in pulses, as selected, to the ink spot marker, opening and closing the needle valve such that the ink is ejected in like pulses. The pulses continue until the external control signal is no longer received. As in the continuous stripe marking mode, the length of the on and off periods are that of the pulse width parameter selected.

With the number of pulses parameter selected for display, simultaneously actuating the marker parameter selector switch and the pulse control switch changes the parameter displayed from the number of pulses to the marking mode, a subsequent simultaneous actuation of these two switches changing the parameter displayed back to the number of pulses. With the marking mode selected for display, and the external-internal switch in its internal position, actuating the pulse control switch selects one of the three marking modes, dot marking, continuous stripe marking or continuous pulse marking.

With the continuous stripe marking mode and the ink spot location parameter selected for display, actuating the marker parameter selector switch changes the parameter displayed from the ink spot location to the off pulse period, a subsequent actuation of this switch changing the parameter displayed back to the ink spot location. With the off pulse period selected for display, adjusting the appropriate timing control sets the desired off pulse period.

The electronically controlled marking system includes a high-pressure regulating valve having an input and a constant, high-pressure output. Its input is connected to the source of high-pressure gas and its output is connected to the input of the high-pressure gas valve to provide a constant gas pressure input thereto.

The electronically controlled marking system further includes a low-pressure regulating valve having an input and a constant, low-pressure output. Its input is connected to the output of the high-pressure regulating valve and its output is connected to the input of the low-pressure gas valve to provide a constant gas pressure input thereto.

A gas filter is also included in the electronically controlled marking system and has an input and an output. Its input is connected to the source of high-pressure gas and its output is connected to the input of the high-pressure regulating valve to ensure that the gas supplied to the pneumatic components of the electronically controlled marking system is substantially free of harmful contaminants.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
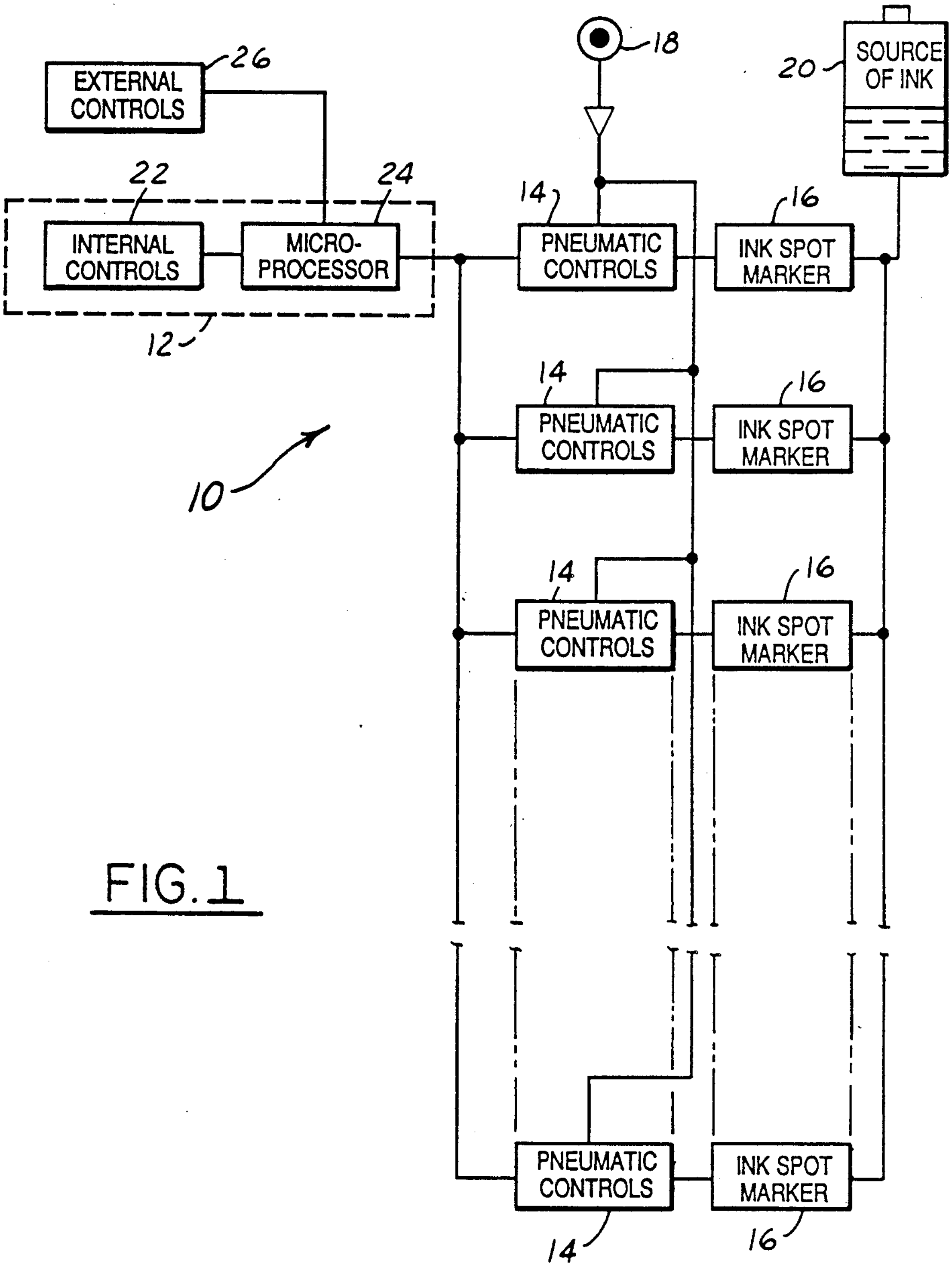
FIG. 1 is a block diagram of the electronically controlled marking system of the present invention.

With reference to FIG. 1 of the drawings, an improved electronically controlled marking system constructed in accordance with the present invention is generally indicated by reference numeral 10. This electronically controlled marking system 10 includes an electronic control module 12, at least one ink spot marker 16 and associated pneumatic controls 14. The electronic control module 12 includes internal controls 22 and a microprocessor 24 having a nonvolatile memory (not shown). The microprocessor 24 is connected to the internal controls 22 and is also connected to the pneumatic controls 14, as is each ink spot marker 16.

Figure 3:
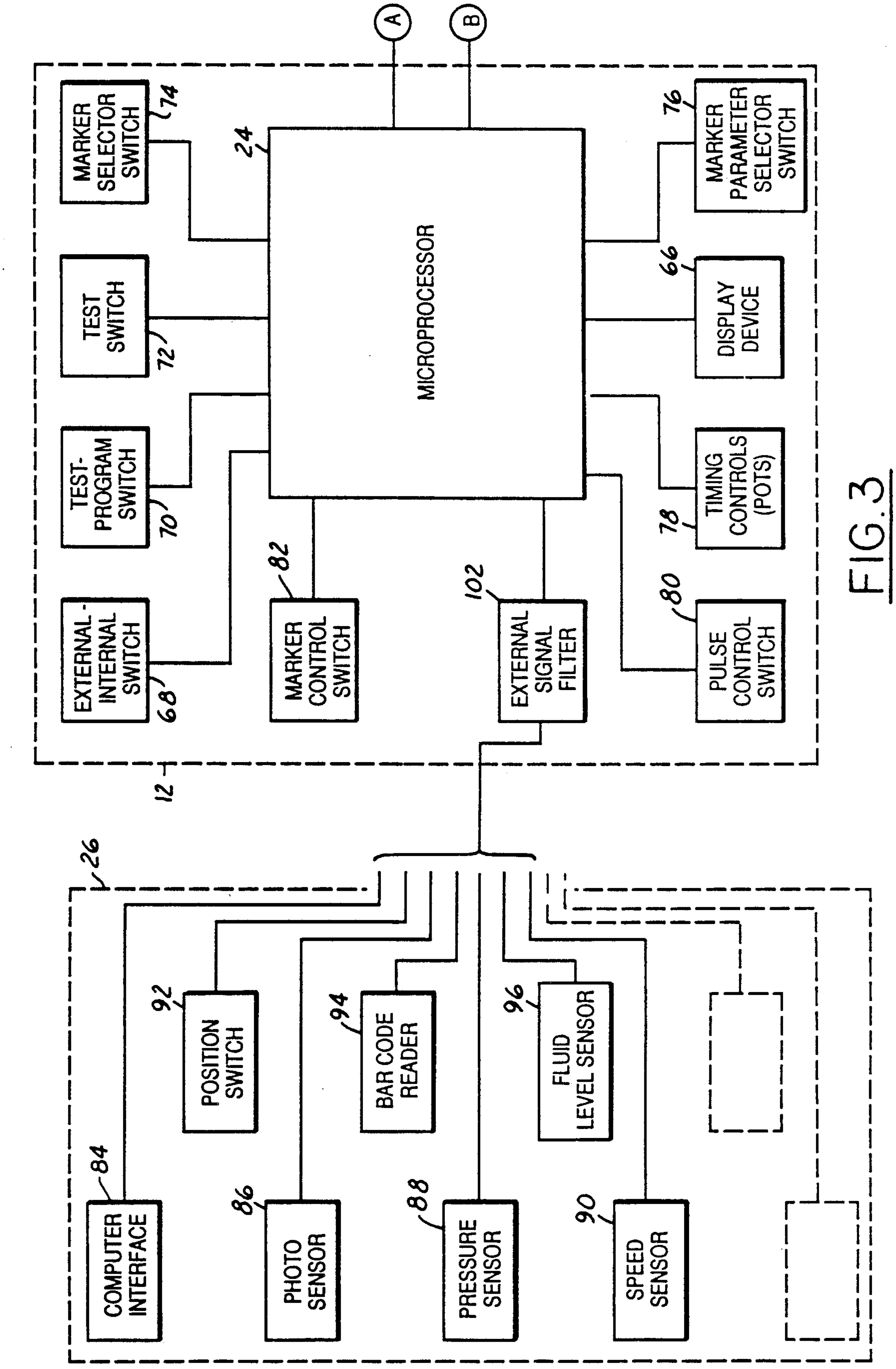
FIG. 3 is block diagram of a portion of the electronically controlled marking system including internal and external, manually and automatically operated control elements.

A set of external controls and sensors 26 is also connected to the microprocessor 24, and the external control signals therefrom may be routed through an external signal filter 102 (as shown by FIG. 3) to establish their validity, the external signal filter 102 generating input control signals in response to recognizing valid external control signals. The pneumatic controls 14 are connected to a source of high-pressure gas 18, which may be compressed air or any suitable gas. The ink spot marker 16 is connected to a source of ink 20, the source being an elevated reservoir, a reservoir and pump or an equivalent thereof suitable for supplying ink to each ink spot marker 16.

Figure 2:
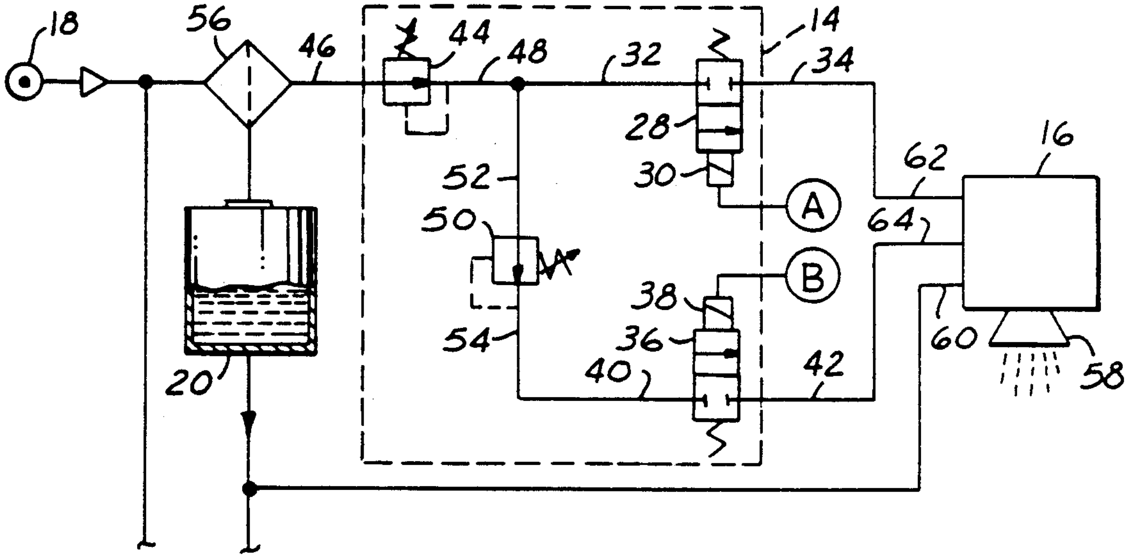
FIG. 2 is a schematic representation of a portion of the electronically controlled marking system including pneumatic control and ink-related elements of the present invention.

With reference to FIG. 2, shown are the pneumatic controls 14 associated with each ink spot marker 16. The pneumatic controls 14 include a high-pressure gas valve 28 that is actuatable by a high-pressure gas valve solenoid 30 and that has an input 32 and an output 34. The pneumatic controls also include a low-pressure gas valve 36 that is actuatable by a low-pressure gas valve solenoid 38 and that also has an input 40 and an output 42. The solenoids 30 and 38 have electrical inputs "A" and "B" respectively that are electrically connected to the electronic control module 12 shown on FIG. 1.

Also included in the pneumatic controls 14 is a high-pressure regulating valve 44 having an input 46 and a selectable, constant, high-pressure output 48. Its input 46 is connected to the source of high-pressure gas 18, and its output 48 is connected to the input 32 of the high-pressure gas valve to provide a constant gas pressure input thereto. The gas pressure at the output 48 of the high-pressure regulator valve is within a range of 60 to 70 pounds per square inch (414 to 483 kilopascals) and preferably and is preferably 65 pounds per square inch (448 kilopascals).

A low-pressure regulating valve 50 having an input 52 and a selectable, constant, low-pressure output 54 is also included. Its input 52 is connected to the output 48 of the high-pressure regulating valve 44, and its output 54 is connected to the input 40 of the low-pressure gas valve 36 to provide a constant gas pressure input thereto. The gas pressure at the output 54 of the low-pressure regulator valve 50 within a range of 2.5 and 7.5 pounds per square inch (17 to 52 kilopascals) and is preferably 5 pounds per square inch (35 kilopascals). As shown, a gas filter 56 may be connected between the source of high-pressure gas 18 and the input 46 of the high-pressure regulator valve 44 to ensure that the gas supplied to the pneumatic controls 14 is substantially free of harmful contaminants.

As mentioned, the electronically controlled marking system 10 of the present invention includes at least one ink spot marker 16 that has an output nozzle 58, an ink input 60 connected to the source of ink 20, a high-pressure input 62 connected to the output 34 of the high-pressure gas valve 36, and a low-pressure input 64 connected to the output 42 of the low-pressure gas valve 36.

FIG. 3 illustrates the basic elements of the electronic control module 12. Shown is the microprocessor 24 and a display device 66 interconnected with a number of manually operable internal, or local, controls 22, shown in FIG. 1. The display device 66 may be a set of light-emitting diodes or a similar, well-known device and is used to indicate visually the ink spot marker being monitored and, alternatively, various parameters selected therefor. The display device 66 is preferably a three-digit, seven-segment LED display. The parameters displayed include the number of pulses per marking cycle and the periods defined between time $t_0$ and time $t_1$, between time $t_1$ and time $t_2$, between time $t_2$ and time $t_3$, and between time $t_3$ and time $t_4$.

The internal controls include an external-internal switch 68 used to select either external, or remote, control of the marking system 10 or internal, or local, control thereof. A test-program switch 70 is included to test the operation of a selected ink spot marker 16 with preselected, test-program marker parameters or to enable the programming of test-program marker parameters into the nonvolatile memory. A test switch 72 is included to initiate the action selected by the test-program switch 70. A marker selector switch 74 is included to select the ink spot marker 16 to be tested or to have its parameters displayed by the display device 66. A marker parameter selector switch 76 is included to select either the ink spot marker number or one of the marker's associated parameters to be displayed by the display device 66.

A set of timing controls 78, which may typically each be an adjustable electrical potentiometer, is included to set times $t_1$ through $t_4$ with respect to a time $t_0$, which is the time an ink spot marking cycle is initiated, and thereby define specific pressurized-gas application periods. A pulse control switch 80 is included to select the number of times per marking cycle that the high-pressure gas is applied to eject ink. A marker control switch 82 is included to select the maximum number of ink spot markers 16 to be controlled by the electronic control module 12. An external signal filter 102 is included to filter external control signals from the external controls 26 to ensure the validity of the signals, the external signal filter 102 generating input control signals in response to recognizing valid external control signals. Two outputs, "A" and "B", are also shown by FIG. 3; and they are electrically connected to the associated inputs "A" and "B" of the high-pressure gas valve solenoid 30 and the low-pressure gas valve solenoid 38 respectively shown by FIG. 2.

FIG. 3 also illustrates the external, or remote, controls and sensors 26 that may also be electrically interconnected with the microprocessor 24 and the display device 66. Shown is a computer interface 84, a photo sensor 86, a pressure sensor 88, a speed sensor 90, a position switch 92, a bar code reader 94, and a fluid level sensor 96. The phantom boxes shown indicate that the types of external sensors and controls illustrated are not exhaustive and that others may be added.

Figure 4:
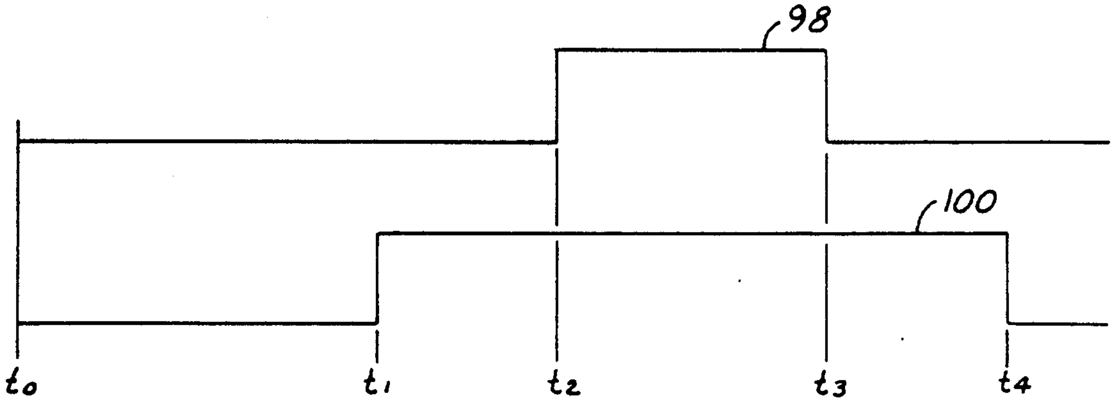
FIG. 4 is a timing chart showing the application sequence of high-pressure and low-pressure gas to control various elements of the electronically controlled marking system.

FIG. 4 shows the sequence of application of high-pressure gas 98 and low-pressure gas 100 to control various elements of the electronically controlled marking system 10. With reference now to all the figures, a basic operation of the electronically controlled marking system 10 may be described as follows. An input control signal is generated at a time $t_0$ by the electronic control module to initiate an ink spot marking cycle. The input control signal is generated in response to an external control signal received from externally located controls 26 or in response to a control signal generated within the electronic control module 12. Low-pressure gas is applied by the low-pressure gas valve 36 (as shown by FIG. 2) to the ink spot marker 16 at a time $t_1$ to begin atomizing ink therewithin. High-pressure gas is applied by the high-pressure gas valve 28 to the ink spot marker 16 at a time $t_2$.

The high-pressure gas withdraws a needle from an associated needle valve (not shown) in the output nozzle of the ink spot marker 16, thereby opening the needle valve and allowing the low-pressure gas to begin ejecting ink. High-pressure gas is removed by the high-pressure gas valve 28 from the ink spot marker 16 at a time $t_3$ to terminate ink ejection. Low-pressure gas remains applied to the ink spot marker 16 to clear any remaining ink from the marker nozzle and is finally removed by the low-pressure gas valve 36 from the ink spot marker 16 at a time $t_4$. The period defined between time $t_0$ and time $t_1$ provides an adjustable interval to facilitate the accurate positioning of an ink spot if it is to be imparted to a moving target (not shown).

Prior to operating the electronically controlled marking system 10, the controls of the electronic control module 12 must set to desired parameters and the parameters stored in the nonvolatile memory of the microprocessor 24. The marker control switch 82 is set to correspond the number of ink spot markers 16 that are to be controlled by the electronic control module 12. The marker control switch 82 setting is sensed only during a power-up phase of the electronically controlled marking system 10 operation. If the electronically controlled marking system 10 is to be controlled externally, or remotely, the external-internal switch 68 is set to its "external" position. If the marking system 10 is to be controlled internally, or locally, the external-internal switch 68 is set to its "internal" position.

With the external-internal switch 68 set to its "internal" position and the marker parameter selector switch 76, which is preferably a six-position switch, set so that ink spot marker numbers are displayed by the display device 66, a particular ink spot marker 16 can be selected by actuating the marker selector switch 74, which is preferably a momentary contact switch.

Once a specific ink spot marker 16 has been selected, its individual parameters can be displayed by the display device 66 by setting the marker parameter selector switch 76 to a position that corresponds to the parameter to be displayed. The periods during which high-pressure gas and low-pressure gas are to be applied to an ink spot marker 16 are defined by adjusting each of the timing controls, or electrical potentiometers, 78 to set correspondingly the times $t_1$ through $t_4$ with respect to time $t_0$, which is the time an ink spot marking cycle is initiated. Actuating the test switch 72 programs the time parameters into the nonvolatile memory of the microprocessor 24.

The electronically controlled marking system 10 provides an option of ejecting ink from the output nozzle 58 of an ink spot marker 16 in a single or in a controllable series of pulses during the period defined between time $t_2$ and time $t_3$. With the marker parameter selector switch 76 set to its remaining position so that the number of high-pressure gas pulses that are to be applied during one ink spot marking cycle is displayed by the display device 66, the number of pulses can be selected by actuating the pulse control switch 80, which is preferably a momentary contact switch. Actuating the test switch 72 programs the pulse control parameters into the nonvolatile memory of the microprocessor 24.

After the controls of the electronic control module 12 have been set to desired ink spot marker parameters and the parameters have been stored in the nonvolatile memory of the microprocessor 24, the electronically controlled marking system is ready for operation. High-pressure gas is applied from the source 18 thereof through the gas filter 56 to the input 46 of the high-pressure regulator valve 44. Regulated, high-pressure gas from the output 48 of the high-pressure regulator valve 44 is applied to the input 32 of the high-pressure gas valve 28 and also to the input 52 of the low-pressure regulator valve 50. Regulated, low-pressure gas from the output 54 of the low-pressure gas regulator 50 is applied to the input 40 of the low-pressure gas valve 36.

When an input control signal is generated by the electronic control module 12 in response to an external control signal received from the external controls 26 or in response to a control signal generated within the electronic control module, time $t_0$ is established to begin a marking cycle. At time $t_1$, after a selected period ranging between 0 and 10 seconds, a control signal is sent from the electronic control module 12 to the low-pressure gas valve solenoid 38. The solenoid 38 opens the low-pressure gas valve 36, and low-pressure gas is applied from the output 42 thereof to the low-pressure input 64 of the ink spot marker 16. The low-pressure gas atomizes ink in the ink spot marker 16 in preparation of its ejection.

At time $t_2$, after a selected period ranging between 0 and 200 milliseconds, and preferably between 10 and 30 milliseconds, a control signal is sent from the electronic control module 12 to the high-pressure gas valve solenoid 30. The solenoid 30 opens the high-pressure gas valve 28, and high-pressure gas is applied from the output 34 thereof to the high-pressure input 62 of the ink spot marker 16. The high-pressure gas opens a needle valve (not shown) in the ink spot marker 16, initiating ink ejection from the output nozzle 58.

If pulsed ink ejection has been selected, a control signal is sent from the electronic control module 12 to the high-pressure gas valve solenoid 30 that causes it to open and close the high-pressure gas valve 28 a selected number of times during the existing ink marking cycle. As a result, pulsating high-pressure gas is applied from the output 34 of the high-pressure gas valve 28 to the high-pressure input 62 of the ink spot marker 16. The pulsating high-pressure gas opens and closes the needle valve (not shown) in the ink spot marker 16, initiating pulsed ink ejection from the output nozzle 58 and simultaneously evicting any material blocking the needle valve by repeatedly and alternately thrusting a valve needle into and retracting the needle from the needle valve.

At time $t_3$, after a selected period ranging between 0 and 200 milliseconds, and preferably between 80 and 110 milliseconds, a control signal is sent from the electronic control module 12 to the high-pressure gas valve solenoid 30. The solenoid 30 closes the high-pressure gas valve 28, and high-pressure gas is removed from the high-pressure input 62 of the ink spot marker 16. The removal of the high-pressure gas closes the needle valve (not shown) in the ink spot marker 16, terminating ink ejection from the output nozzle 58. Although high-pressure gas has been removed from the ink spot marker 16, low-pressure gas is still being applied, forcing any remaining ink from the output nozzle 58.

At time $t_4$, after a selected period ranging between 0 and 200 milliseconds, and preferably between 10 and 30 milliseconds, a control signal is sent from the electronic control module 12 to the low-pressure gas valve solenoid 38. The solenoid 38 closes the low-pressure gas valve 36, and low-pressure gas is removed from the low-pressure input 64 of the ink spot marker 16. The removal of the low-pressure gas terminates the forcing of residue ink from the output nozzle 58 and marks the end of an ink marking cycle.

Figure 5:
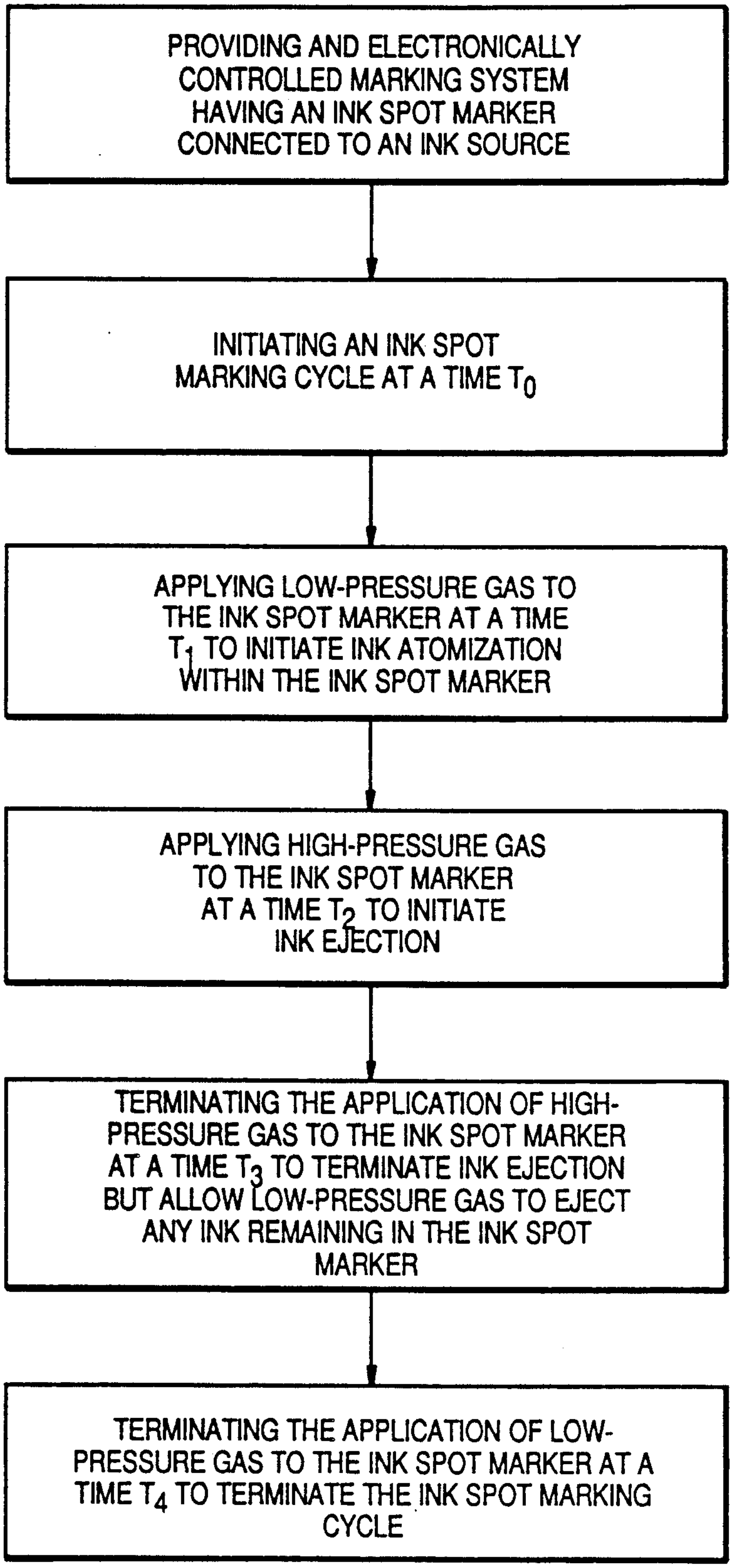
FIG. 5 is a flowchart illustrating a method for operating the electronically controlled marking system of the present invention.

The basic steps in operating the electronically controlled marking system are outlined by FIG. 5. The steps include providing an electronically controlled marking system having an ink spot marker connected to an ink source, initiating an ink spot marking cycle at time $t_0$, applying low-pressure gas to the ink spot marker at time $t_1$ to initiate ink atomization within the ink spot marker, applying high-pressure gas to the ink spot marker at time $t_2$ to initiate ink ejection, terminating the application of high-pressure gas to the ink spot marker at time $t_3$ to terminate ink ejection but allow low-pressure gas to eject any ink remaining in the ink spot marker, and terminating the application of low-pressure gas to the ink spot marker at time $t_4$, thereby terminating the ink spot marking cycle.

The electronically controlled marking system 10, as shown on FIG. 1, may be operated in any one of three modes. The basic mode, which has been the mode of operation described to this point, is referred to as a dot marking mode. The marking system 10 may also be operated in a continuous stripe marking mode and in a continuous pulse marking mode.

In the continuous stripe marking mode, whenever a valid external control signal is received, the high-pressure gas is applied to the ink spot marker 16, opening the needle valve thereof and allowing the low-pressure gas to eject ink until the external control signal is no longer received. If the option of ejecting ink in pulses is selected, the high-pressure gas is applied in pulses the number of which equals one less than the number of pulses selected. The high-pressure gas is then applied continuously until the external control signal is no longer received.

The effect of operating in the continuous stripe marking mode on the application sequence of high-pressure and low-pressure gas to control various elements of the electronically controlled marking system 10 may be more easily understood by referring to the timing chart illustrated by FIG. 4. When operating in the continuous stripe marking mode, once a valid external control signal is received, the occurrence of the time $t_3$ is delayed until the external control signal is no longer received, the time $t_3$ being the time at which high-pressure gas is removed from the ink spot marker 16 shown in FIG. 3.

The continuous application of high-pressure gas may be interrupted by a series of off pulses generated by the electronic control module 12. The periods between the off pulses may be selected, and they may be varied between 6 seconds and 20 minutes. A period value of zero may also be selected, in which case no off pulses are generated. The width of the off pulses are determined by the pulse width parameter selected.

In the continuous pulse marking mode, whenever a valid external control signal is received, the high-pressure gas is applied in pulses, as selected, to the ink spot marker 16, opening and closing the needle valve thereof such that the ink is ejected in like pulses. The pulses continue until the external control signal is no longer received. As in the continuous stripe marking mode, the length of the on and off periods are that of the pulse width parameter selected.

With the number of pulses parameter selected for display, simultaneously actuating the marker parameter selector switch 76 and the pulse control switch 80 changes the parameter displayed from the number of pulses to the marking mode, a subsequent simultaneous actuation of these two switches changing the parameter displayed back to the number of pulses. With the marking mode selected for display, and the external-internal switch 68 in its internal position, actuating the pulse control switch 80 selects one of the three marking modes, dot marking, continuous stripe marking or continuous pulse marking.

With the continuous stripe marking mode and the ink spot location parameter selected for display, actuating the marker parameter selector switch 76 changes the parameter displayed from the ink spot location to the off pulse period, a subsequent actuation of this switch changing the parameter displayed back to the ink spot location. With the off pulse period selected for display, adjusting the appropriate timing control 78 sets the desired off pulse period.

The objects, features and advantages of the present invention are readily apparent from the following detailed description of the best mode for carrying out the invention when taken in connection with the accompanying drawings.

What is claimed is:

1. An electronically controlled marking system for imparting an ink spot to a stationary or moving target, the electronically controlled marking system comprising:

a high-pressure gas valve actuatable by a high-pressure gas valve solenoid and having an input and an output, the input thereof being connected to a source of high-pressure gas;

a low-pressure gas valve actuatable by a low-pressure gas valve solenoid and having an input and an output, the input thereof being connected to a source of low-pressure gas;

at least one ink spot marker having an output nozzle, an ink input connected to a source of ink, a high-pressure input connected to the output of the high-pressure gas valve, and a low-pressure input connected to the output of the low-pressure gas valve, the ink spot marker being responsive to an application of high-pressure gas to allow an ejection of ink from the output nozzle under the urging of a simultaneous application of low-pressure gas; and an electronic control module connected to the high-pressure gas valve solenoid to control the passage of high-pressure gas from the source thereof to the high-pressure input of the ink spot marker, the electronic control module also being connected to the low-pressure gas valve solenoid to control the passage of low-pressure gas from the source thereof to the low-pressure input of the ink spot marker, an ink spot marking cycle being initiated at a time $t_0$, low-pressure gas being applied by the low-pressure gas valve to the ink spot marker at a subsequent time $t_1$, high-pressure gas being applied by the high-pressure gas valve to the ink spot marker at a subsequent time $t_2$, high-pressure gas being removed by the high-pressure gas valve from the ink spot marker at a subsequent time $t_3$, low-pressure gas being removed by the low-pressure gas valve from the ink spot marker at a subsequent time $t_4$, the period defined between time $t_0$ and time $t_1$ being provided to facilitate the accurate positioning of an ink spot on a moving target, the period defined between time $t_1$ and time $t_2$ being provided to allow the low-pressure gas to atomize ink within the ink spot marker, the period defined between time $t_2$ and time $t_3$ being provided to eject ink from the output nozzle of the ink spot marker, and the period defined between time $t_3$ and time $t_4$ being provided to allow the low-pressure gas to force any remaining ink from the ink spot marker output nozzle.

2. The electronically controlled marking system according to claim 1, wherein the electronic control module comprises a microprocessor and a manually adjustable timing control for setting each one of times $t_1$ through $t_4$, with respect to time $t_0$, to specify the periods defined thereby, the microprocessor having a nonvolatile memory, the times $t_1$ through $t_4$ being stored in the nonvolatile memory.

3. The electronically controlled marking system according to claim 2, wherein each timing control is an adjustable electrical potentiometer.

4. The electronically controlled marking system according to claim 2, wherein the electronic control module further comprises a manually operable pulse control switch to provide an option of ejecting ink from the output nozzle of the ink spot marker in one pulse or in a controllable series of pulses during the period defined between time $t_2$ and time $t_3$, the number of pulses selected being stored in the nonvolatile memory of the microprocessor.

5. The electronically controlled marking system according to claim 4, wherein the pulse control switch has a momentary, actuated position and a normal, nonactuated position.

6. The electronically controlled marking system according to claim 4, wherein the ink spot marker includes a needle valve responsive to an application of high-pressure gas to allow an ejection of ink from the output nozzle under the urging of a simultaneous application of low-pressure gas to the ink spot marker.

7. The electronically controlled marking system according to claim 6, wherein high-pressure gas is pulsed to provide a consequential pulsing of ejected ink.

8. The electronically controlled marking system according to claim 7, wherein the electronic control module further comprises a manually operable marker control switch to select a maximum number of ink spot markers to be controlled by the electronic control module.

9. The electronically controlled marking system according to claim 8, wherein the electronic control module further comprises a display device to visually identify the ink spot marker being monitored and parameters selected therefor, the parameters including the number of ink ejecting pulses per marking cycle and the periods defined between time $t_0$ and time $t_1$, between time $t_1$ and time $t_2$, between time $t_2$ and time $t_3$ and between time $t_3$ and time $t_4$.

10. The electronically controlled marking system according to claim 9, wherein the electronic control module further comprises a manually operable marker selector switch to select for display the parameters of a specific ink spot marker and to indicate which ink spot marker is actuated during a test.

11. The electronically controlled marking system according to claim 10, wherein the marker selector switch has a momentary, actuated position and a normal, nonactuated position.

12. The electronically controlled marking system according to claim 10, wherein the electronic control module further comprises a manually operable marker parameter selector switch to select for display a specific parameter of the ink spot marker selected by the marker selector switch.

13. The electronically controlled marking system according to claim 12, wherein the electronic control module further comprises:

a manually operable external-internal switch having an "external" position and an "internal" position;

a manually operable test-program switch having a "test" position and a "program" position; and a manually operable test switch having an actuated position and a normal, nonactuated position;

the external-internal switch, when set to its "external" position, enabling the input of external control signals to the microprocessor;

the test-program switch, when set to its "test" position with the external-internal switch set to its "internal" position, enabling the actuation of the ink spot marker selected by the marker selector switch when the test switch is actuated;

the test-program switch, when set to its "program" position with the external-internal switch set to its "internal" position, enabling the storing in nonvolatile memory of the parameters of a selected ink spot marker when the test switch is actuated.

14. The electronically controlled marking system of claim 13, wherein the test switch has a momentary, actuated position and a normal, nonactuated position.

15. The electronically controlled marking system of claim 14, further comprising a high-pressure regulating valve having an input and a constant, high-pressure output, its input being connected to the source of high-pressure gas and its output being connected to the input of the high-pressure gas valve to ensure a constant gas pressure input thereto.

16. The electronically controlled marking system of claim 15, further comprising a low-pressure regulating valve having an input and a constant, low-pressure output, its input being connected to the output of the high-pressure regulating valve and its output being connected to the input of the low-pressure gas valve to ensure a constant gas pressure input thereto.

17. The electronically controlled marking system of claim 16, further comprising a gas filter having an input and an output, its input being connected to the source of high-pressure gas and its output being connected to the input of the high-pressure regulating valve to ensure that the gas supplied to the pneumatic components of the electronically controlled marking system is substantially free of harmful contaminants.

18. The electronically controlled marking system of claim 17, wherein the pressure of the high-pressure gas is within a range of 60 to 70 pounds per square inch (414 to 483 kilopascals), and the pressure of the low-pressure gas is within a range of 2.5 to 7.5 pounds per square inch (17 to 52 kilopascals).

19. The electronically controlled marking system of claim 18, wherein the electronically controlled marking system has a plurality of marking modes of operation, the marking modes including a dot marking mode, a continuous stripe marking mode and a continuous pulse marking mode.

20. The electronically controlled marking system of claim 19, wherein, with the electronically controlled marking system in the dot marking mode, the period defined between time $t_1$ and time $t_2$ is within a range of 0 to 200 milliseconds, the period defined between time $t_2$ and time $t_3$ is within a range of 0 to 200 milliseconds, and the period defined between time $t_3$ and time $t_4$ is within a range of 0 to 200 milliseconds.

21. The electronically controlled marking system of claim 20, wherein, with the electronically controlled marking system in the continuous stripe marking mode, the period defined between time $t_2$ and time $t_3$ is equal to the time a valid external control signal is received by the electronic control module.

22. The electronically controlled marking system of claim 21, wherein, with the electronically controlled marking system in the continuous pulse marking mode, the period defined between time $t_2$ and time $t_3$ is equal to the time a valid external control signal is received by the electronic control module.

23. The electronically controlled marking system of claim 21, wherein, with the electronically controlled marking system in the continuous stripe marking mode, the high-pressure gas applied to the ink spot marker between time $t_2$ and $t_3$ is selectively interruptable by a series of off pulses generated by the electronic control module and separated by adjustable periods.

24. The electronically controlled marking system of claim 23, further including an off pulse timing control to set the periods between off pulses.

25. The electronically controlled marking system of claim 24, wherein the off pulse timing control is an adjustable electrical potentiometer.

26. The electronically controlled marking system of claim 24, wherein the periods between the off pulses may be selectively varied between 6 seconds and 20 minutes, the width of the off pulses being determined by the pulse width parameter selected.

27. The electronically controlled marking system of claim 26, wherein, with the external-internal switch set to its "internal" position and the number of ink ejecting pulses parameter selected for display by the display device, simultaneously actuating the marker parameter selector switch and the pulse control switch alternately change the parameter displayed by the display device from the number of ink ejecting pulses to the marking mode and back, and actuating the pulse control switch with the marking mode selected for display by the display device selects one of the marking modes.

28. The electronically controlled marking system of claim 27, wherein, with the electronically controlled marking system in the continuous stripe marking mode, with the external-internal switch set to its "internal" position and the ink spot location parameter selected for display by the display device, actuating the marker parameter selector switch alternately changes the parameter displayed by the display device from the ink spot location to the off pulse period and back.

29. In an electronically controlled marking system having a controllable source of high-pressure gas, a controllable source of low-pressure gas, and an ink spot marker connected to a source of ink and being responsive to the application of low-pressure gas and high-pressure gas respectively to atomize and eject ink from an output nozzle thereof, a method for imparting an ink spot to a stationary or moving target, the method comprising the steps of:

initiating an ink spot marking cycle at a time $t_0$;

applying low-pressure gas to the ink spot marker at a subsequent time $t_1$ to atomize ink supplied to the ink spot marker;

applying high-pressure gas to the ink spot marker at a subsequent time $t_2$, the ink spot marker being responsive to the application of high-pressure gas to allow an ejection of ink from the output nozzle under the urging of a simultaneous application of low-pressure gas;

terminating the application of high-pressure gas at a subsequent time $t_3$ to terminate the ejection of ink from the ink spot marker output nozzle and to permit low-pressure gas still applied to the ink spot marker to force from the output nozzle thereof any remaining traces of ink; and terminating the application of low-pressure gas to the ink spot marker at a subsequent time $t_4$ to complete an ink spot marking cycle.

30. The method of claim 29, wherein, during the application of high-pressure gas between time $t_2$ and time $t_3$, the high-pressure gas is applied in a series of controlled pulses, rather than in one pulse, to provide ink ejection that is similarly pulsed.

* * * * *